United States Patent [19]

Ueno

[11] 4,259,880

[45] Apr. 7, 1981

[54] MULTI-STAGE GEAR CRANK FOR A BICYCLE

[75] Inventor: Tadashi Ueno, Sakai, Japan

[73] Assignee: Shimano Industrial Company, Limited, Osaka, Japan

[21] Appl. No.: 968,093

[22] Filed: Dec. 8, 1978

[30] Foreign Application Priority Data

Dec. 16, 1977 [JP] Japan .............................. 52-152238

[51] Int. Cl.³ .............................................. G05G 1/14
[52] U.S. Cl. .................................... 74/594.2; 474/160
[58] Field of Search ............... 74/594.2, 243 R, 217 B

[56] References Cited

U.S. PATENT DOCUMENTS

| | | | |
|---|---|---|---|
| 3,661,021 | 5/1972 | Ohshita | 74/217 B |
| 3,709,053 | 1/1973 | Ohshita | 74/243 R |
| 3,772,932 | 11/1973 | Nagano | 74/243 R |
| 3,956,943 | 5/1976 | Yamasaki | 74/243 R |

*Primary Examiner*—Kenneth Dorner
*Attorney, Agent, or Firm*—Stevens, Davis, Miller & Mosher

[57] ABSTRACT

A multi-stage gear crank for a bicycle has chain detaching means facilitating disengagement of a driving chain from the teeth of sprockets, the detaching means being provided at teeth positioned in the vicinity of the upper and lower dead points of a larger diameter sprocket corresponding to the crank arms respectively, whereby the chain is adapted to be switched to a smaller diameter sprocket from the larger diameter sprocket at the upper dead point thereof.

7 Claims, 7 Drawing Figures

MULTI-STAGE GEAR CRANK FOR A BICYCLE

This invention relates to a multi-stage gear crank for a bicycle, and more particularly to a multi-stage gear crank which is provided at both axial ends of a crank shaft with a pair of crank arms and at one of the crank arms with multi-stage sprocket assembly comprising at least one larger diameter sprocket and at least one smaller diameter sprocket (which are hereinafter called gears).

Generally, this kind of crank gear is adapted to carry a driving chain across the larger diameter gear or smaller diameter gear and rear gears mounted to a rear hub, so that a front derailleur shifts the chain axially to one of the gears of the multi-stage gears, thereby transmitting the driving force by pedalling to a rear wheel at a given speed change ratio.

Teeth of each gear constituting the multi-stage gear assembly are aligned on the center line of thickness of the gear body. The front derailleur is provided with a chain guide which moves between high speed and low speed positions and with a return spring to return the chain guide to the low speed position from the high speed position. The chain guide is shifted toward the high speed position against the return spring switching the chain from the smaller diameter gear to the larger diameter one and the return spring acts to return the chain guide to the low speed position.

When the return spring returns the chain guide to the low speed position, especially when driving the bicycle up-hill, the chain is occasionally subjected to tension which is increased by treading pedals mounted to the ends of the crank arms and which overcomes the return spring force, whereby the increased tension, may cause the return spring not to return the chain guide for changing the bicycle speed. Accordingly, the treading force should be reduced more than the return spring force to change speed. As a result, a problem has been raised in that the bicycle is hindered in its drive especially on an up-hill road.

The foregoing problem may be solved by increasing the return spring force. On the contrary, not only does the speed-change control force against the greater return spring force becomes great but the larger diameter gear and chain are subjected to excessive strain so as to lead to poor durability, which is undesirable for a user.

On the other hand, the chain is, when switched to the smaller diameter gear from the larger diameter gear, not readily detached from teeth thereof because the teeth are aligned as aforegoing, resulting in a delay of chain switch to make the speed change efficiency poor.

In view of the aforesaid problems, this invention has been designed. An object of the invention is to provide a multi-stage gear crank capable of reliably changing the bicycle speed without increasing the return spring force and without modifying the driving force by pedalling when change speed while driving the bicycle up-hill.

In other words, the inventor has noticed that the torque of the crank arm in pedalling becomes minimun at the upper and lower dead points of the gear, i.e., both dead points at the pair of crank arms. The invention is directed to provide chain-detaching means for facilitating disengagement of the chain from teeth positioned in the vicinity of the upper and lower dead points at the larger diameter gear, whereby the pedalling need not be modified for reliable speed-change and the larger diameter gear and chain are not subjected to excessive strain because a strong force is unnecessary for effecting the speed change.

These and other objects and features of the invention will become more apparent upon a reading of the following detailed specification and drawings, in which.

Figure 1:
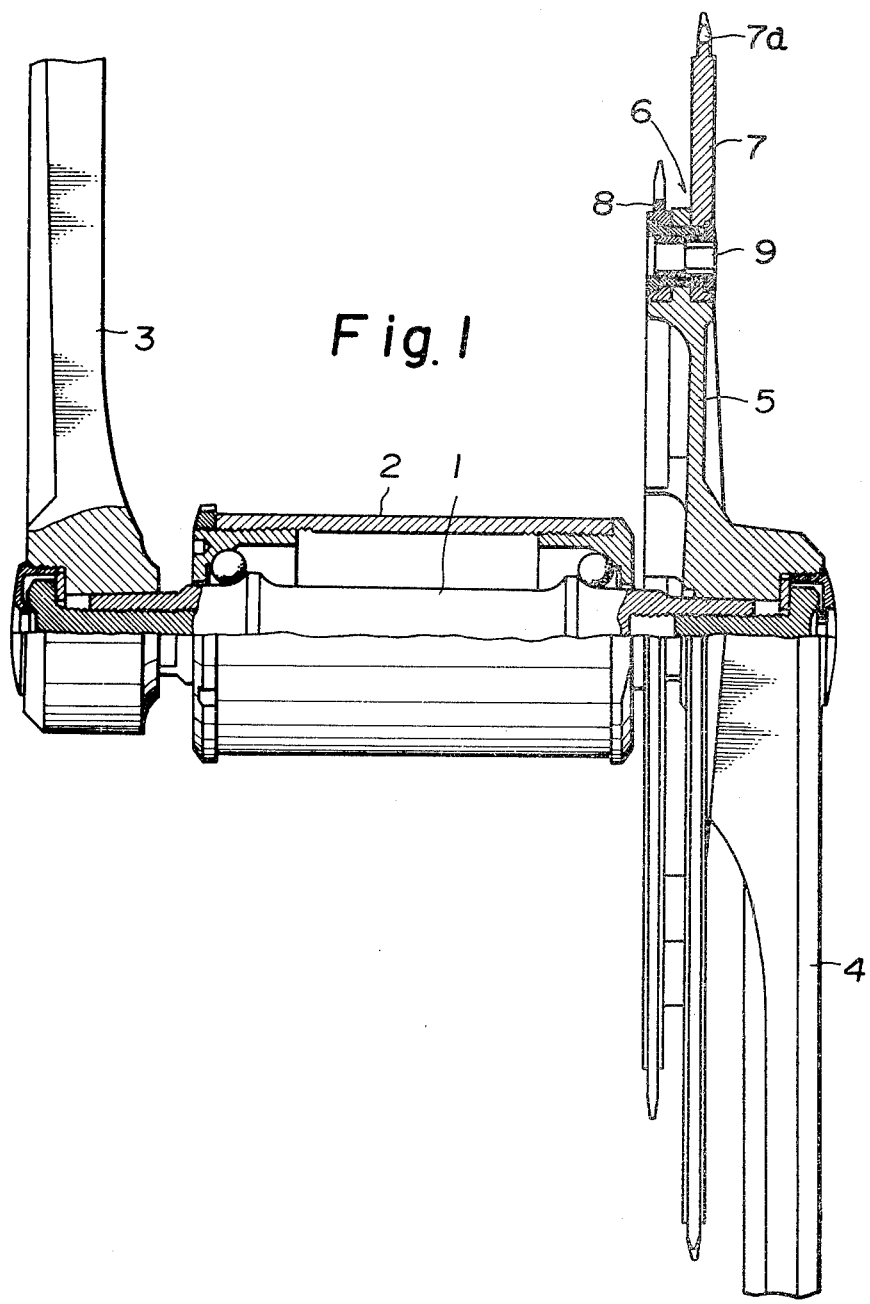
FIG. 1 is a partially cutaway front view of an embodiment of the invention.
Figure 2:
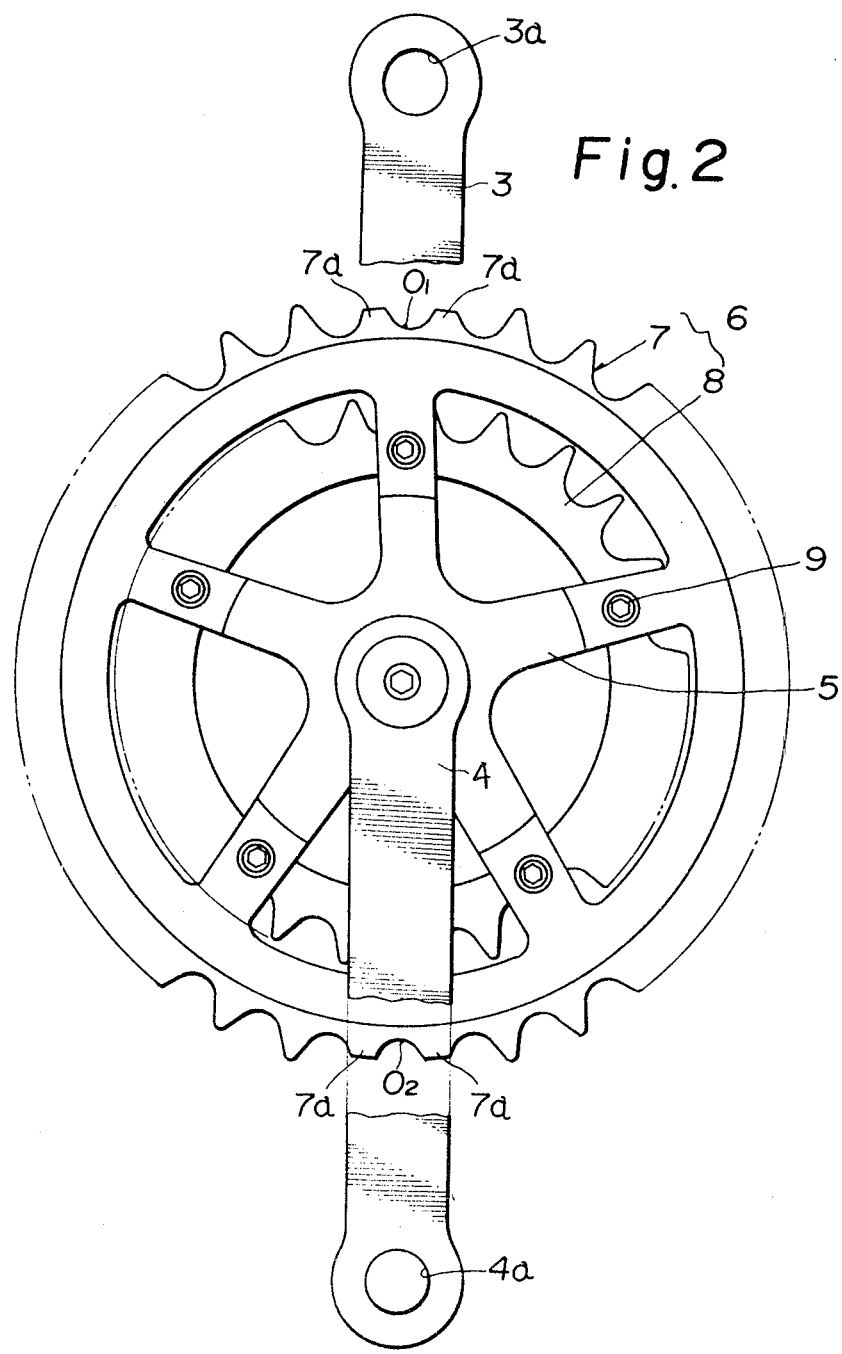
FIG. 2 is a partial side view thereof.

Referring to FIGS. 1 and 2, reference numeral 1 designates a crank shaft supported rotatably to a bracket lug 2 fixed to the bicycle frame, the crank shaft 1 carrying at both axial ends thereof a pair of crank arms 3 and 4 positioned at an angle of 180°. The crank arms 3 and 4 have shaft holes $3a$ and $4a$ as shown in FIG. 2, into which shaft holes pedals (not shown) are insertably mounted. Arms 5 are provided at one crank arm 4 and extending radially of the boss thereof to support multi-stage gear assembly 6. The multi-stage gear assembly 6 comprises a larger diameter gear 7 and a smaller diameter gear 8, the gears 7 and 8 being connected axially at a regular interval therebetween through a plurality of connectors 9 and being mounted therethrough to the arms 5. Positions and mounting methods for the gears are well-known and will not be particularly defined.

A driving chain 10 is stretched across the larger diameter gear 7 or smaller diameter gear 8 and one rear gear (not shown) and is shifted axially of the gears 7 and 8 by means of a front derailleur which is provided radially outward from the larger diameter gear 7, whereby the chain 10 is switched to the gear 7 or 8. Thus, the driving force by pedalling is transmitted to the rear wheel of the bicycle at a given speed-change ratio.

The multi-stage gear crank of the invention of the foregoing type is provided with chain-detaching means for facilitating disengagement of the chain from the gear teeth. The chain-detaching means are formed at least one tooth in the vicinity of the upper dead point $O_1$ and at one tooth at the lower dead point $O_2$ at the larger diameter gear 7, the dead points $O_1$ and $O_2$ corresponding to the position of the pair of crank arms 3 and 4 respectively. Hence, the chain 10, when switched from the larger diameter gear 7 to the smaller diameter gear 8, is allowed to come off the teeth in the vicinity of the upper or lower dead point $O_1$ or $O_2$.

The aforesaid upper and lower dead points $O_1$ and $O_2$ at the teeth of larger diameter gear 7 are explained as follows: The upper dead point $O_1$ is identical to the crest opposite to the crank arm 3 upright to the crank shaft 1 when the pair of crank arms 3 and 4 are perpendicular as shown in FIG. 2, and the lower dead point $O_2$ is the bottom opposite to the crank arm 4 extending perpendicularly downwardly with respect to the crank shaft 1. The lower dead point is at the side of the crank arm 3 and the upper dead point at the side of the crank arm 4 upon one half revolution of the crank arms 3 and 4. In addition, the number of teeth at which the chain detaching means are provided, is not particularly defined but is preferably two to three teeth.

The chain detaching means for facilitating the disengagement of the chain from the gear teeth are constituted as shown in FIGS. 2 and 4 through 7. Any one of these detaching means may be selected, but still other means may be selected.

The chain detaching means are based on the principle that when the derailleur moves the chain axially of the gear for changing speed, the chain should ride over the teeth 7a of the larger diameter gear 7 in order to come off the gear 7 by being pushed axially thereof. The chain should therefore be easily moved axially with respect to the teeth 7a, and the chain should be easily slanted because it is slanted as shown in FIG. 3 when shifted toward the smaller diameter gear 8.

Figure 4:
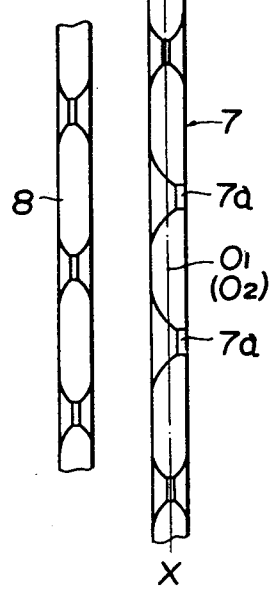
FIGS. 4 through 7 are illustrations of detaching means for facilitating disengagement of the chain from the teeth of gear.
Figure 5:
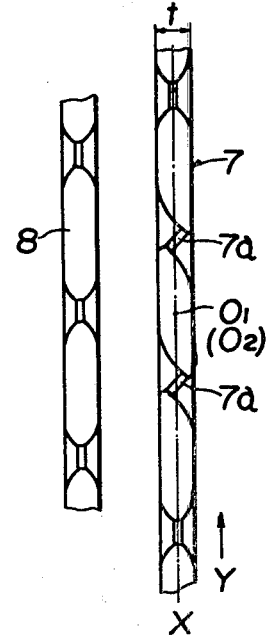
Figure 6:
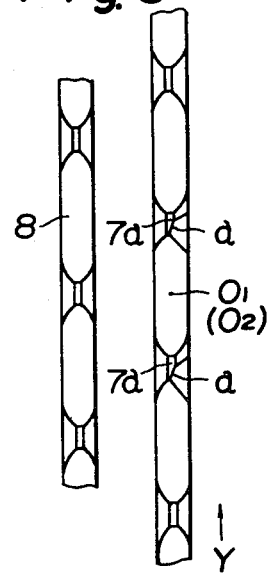
Figure 7:
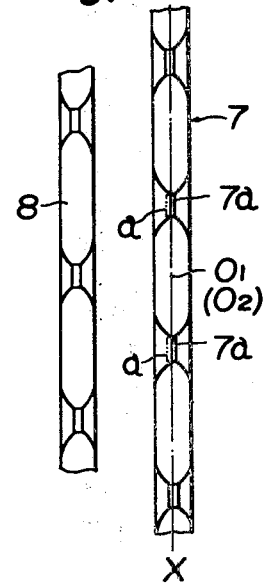

From this, the following methods are applicable for facilitating the chain disengagement. First, the teeth 7a are formed so that the chain may readily ride over and leave the teeth. Namely, tips of teeth 7a in the vicinity of the upper dead point $O_1$ and lower dead point $O_2$ are reduced in level as shown in FIG. 2. In this instance, the teeth 7a may be cut out from the bottoms thereof respectively. Secondly, the chain 10, when lifted by the chain guide radially outwardly from the gear 7 in order to ride over the teeth 7a and being about to fall thereon, is prevented from meshing with the teeth 7a. An embodiment for accomplishing this purpose, as shown in FIG. 4, has the teeth 7a displaced from the center line X of thickness of the gear body toward a side reverse to the smaller diameter gear 8. Also, the chain 10 is made easily movable with respect to the gear or in the slanting direction of the chain so as to readily ride over the teeth 7a. This method is roughly divided into two parts, one of which is that the teeth 7a are, as shown in FIG. 5, slanted in a direction from the side of the gear body opposite the smaller diameter gear 8 toward the reverse side in the forward direction (the arrow Y direction in the drawing) of the gear when the bicycle is running forward. The other part of the method is that the teeth 7a are chamfered a at the outer sides thereof reverse to the smaller diameter gear 8 and at rear portions with respect to forward rotation (the arrow Y direction) thereof, or the teeth 7a are chamfered a at portions thereof from the surfaces opposite to the gear 8 to the center line X of thickness of the gear body.

In the multi-stage gear crank of the invention constructed as aforesaid, the front derailleur is controlled to switch the chain 10 from the larger diameter gear 7 to the smaller diameter gear 8 through the action of the return spring when the teeth 7a at the larger diameter gear 7 reach the upper dead point $O_1$ thereof.

Figure 3:
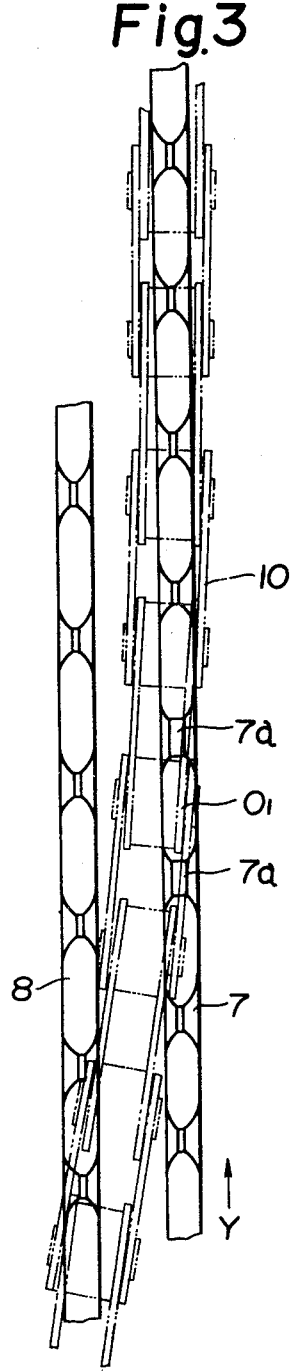
FIG. 3 is an illustration showing mesh of the chain with the multi-stage gear assembly.

Referring to FIG. 3, the chain guide is shifted to the low speed position, so that the chain in mesh with the larger diameter gear 7 remains there at a portion ahead of forward rotation of the multi-stage gear assembly 6 (the arrow Y direction) and shifts radially outward from the smaller diameter gear 8 at the side of the derailleur, thereby being slanted as shown.

At this time, when the crank arms 3 and 4 turn to position the chain 10 at the teeth 7a of the upper dead point $O_1$ at the larger diameter gear 7, the chain 10 can quickly leave the teeth 7a.

When switching the chain at the above upper dead point, torque by pedalling becomes minimum, whereby even when the bicycle is running up-hill the conventional return spring is available to reliably change the bicycle speed.

As clearly understood from the aforesaid description, the multi-stage gear crank of the invention enables the chain to be switched from the larger gear to the smaller gear when the torque by pedalling is minimum, whereby the bicycle speed can reliably be changed during running up-hill without increasing the return spring force and without modifying the pedalling force. Hence, not as great a force is necessary to change the bicycle speed and also the larger diameter gear and chain are not subjected to excessive force when changing speed, resulting in improved durability of the bicycle components.

Furthermore, there is no need for the pedalling force to be weakened to change speed while the bicycle is running up-hill, and the bicycle is therefore not hindered from running.

While the embodiments of the invention have been shown and described, the invention is not limited to the specific construction thereof, which is merely exemplified in the specification rather than defined.

What is claimed is:

1. A multi-stage gear crank for a bicycle, comprising a crank shaft, a pair of crank arms mounted to both axial ends of said crank shaft, and at least one larger diameter gear and at least one smaller diameter gear, both of said gears being mounted at the side of one of said crank arms, whereby said crank arms overlap said gears, said gears having a plurality of teeth for meshing with a driving chain respectively, said crank arms defining two switching points on said larger diameter gear circumference at the points of overlap when said crank arms are substantially vertical, wherein only a minority of said teeth nearest each of said switching points has chain detaching means to allow said chain to readily leave said teeth and wherein the remaining teeth do not include chain detaching means to allow said chain to become readily detached, whereby said chain is switched from said larger diameter gear to the smaller diameter gear at the time said crank arms are substantially vertical and said chain detaching means enables said chain to readily leave said teeth.

2. The multi-stage gear crank for a bicycle according to claim 1, wherein said chain detaching means comprises having said minority of teeth at said larger diameter gear smaller in height than the remaining teeth of said gear.

3. The multi-stage gear crank for a bicycle according to claim 1, wherein said chain detaching means comprises having said minority of teeth at said larger diameter gear displaced toward the side reverse to said smaller diameter gear with respect to the center line of thickness of said larger diameter gear.

4. The multi-stage gear crank for a bicycle according to claim 1, wherein said chain detaching means comprises having said minority of teeth at said larger diameter gear, slanted with respect to the center line of thickness of said larger diameter gear in a range of thickness thereof, said slant teeth being directed from said smaller diameter gear forwardly with respect to forward rotation of said larger diameter gear.

5. The multi-stage gear crank for a bicycle according to claim 1, wherein said chain detaching means comprises said minority of teeth at said larger diameter gear, each of said teeth being chamfered at its outer side reverse to said smaller diameter gear and rearwardly of forward rotation of said larger diameter gear.

6. The multi-stage gear crank for a bicycle according to claim 1, wherein said chain detaching means comprises said minority of teeth of said larger diameter gear being chamfered at its one side parallel to the center line of thickness of said larger diameter gear, thereby being smaller in thickness than other teeth thereof.

7. The multi-stage gear crank for a bicycle according to claim 6, wherein said minority of teeth at said larger diameter gear are chamfered at one side opposite to said smaller diameter gear from the center line of thickness of said larger diameter gear.

* * * * *